United States Patent
Lawson et al.

(10) Patent No.: US 11,907,379 B2
(45) Date of Patent: Feb. 20, 2024

(54) CREATING A SECURE SEARCHABLE PATH BY HASHING EACH COMPONENT OF THE PATH

(71) Applicant: Dell Products L. P., Round Rock, TX (US)

(72) Inventors: David Craig Lawson, Richardson, TX (US); Michael A Phillips, McKinney, TX (US)

(73) Assignee: Dell Products L.P., Round Rock, TX (US)

( * ) Notice: Subject to any disclaimer, the term of this patent is extended or adjusted under 35 U.S.C. 154(b) by 1012 days.

(21) Appl. No.: 16/356,707

(22) Filed: Mar. 18, 2019

(65) Prior Publication Data
US 2020/0302065 A1 Sep. 24, 2020

(51) Int. Cl.
*G06F 21/60* (2013.01)
*G06F 3/06* (2006.01)
*G06F 16/901* (2019.01)
*H04L 9/06* (2006.01)

(52) U.S. Cl.
CPC .......... *G06F 21/602* (2013.01); *G06F 3/0604* (2013.01); *G06F 3/067* (2013.01); *G06F 3/0635* (2013.01); *G06F 16/9014* (2019.01); *G06F 16/9017* (2019.01); *H04L 9/0643* (2013.01)

(58) Field of Classification Search
CPC .... G06F 21/602; G06F 3/0604; G06F 3/0635; G06F 3/067; G06F 16/9014; G06F 16/9017; G06F 16/164; G06F 21/6245; H04L 9/0643; H04L 9/3239
See application file for complete search history.

(56) References Cited

U.S. PATENT DOCUMENTS

| | | | |
|---|---|---|---|
| 9,571,516 B1 * | 2/2017 | Curcic | H04L 67/535 |
| 9,847,994 B1 * | 12/2017 | Kelly | H04L 63/067 |
| 10,496,666 B1 * | 12/2019 | Kurtic | G06F 16/254 |
| 2012/0016695 A1 * | 1/2012 | Bernard | G06Q 40/08 |
| | | | 705/4 |

(Continued)

OTHER PUBLICATIONS

Lucas Kauffman, "How to properly anonymize data, if hashing isn't enough?", p. 1-4, year 2014, downloaded from the Internet, URL: https://security.stackexchange.com/questions/61875/how-to-properly-anonymize-data-if-hashing-isnt-enough, on Mar. 30, 2023 (Year: 2014).*

*Primary Examiner* — Eleni A Shiferaw
*Assistant Examiner* — Vy H Ho
(74) *Attorney, Agent, or Firm* — Egan, Enders & Huston LLP.

(57) ABSTRACT

In some examples, a computing device creates an event log when an event occurs. If the event log includes a path comprising one or more components, the computing device may determine a hash, using a hash function and a salt, for each of the components and substitute each component in the path with an index to the hash stored in a dictionary. In this way, the computing device replaces each component of the path with an index to a hash in the dictionary to create a modified path. The resulting modified path can be traversed and searched. For example, a search term may be hashed using the hash function and salt, and the dictionary associated with the logs searched for a match. In this way, a particular file name or a particular folder name can be identified in the modified path.

25 Claims, 5 Drawing Sheets

(56) References Cited

U.S. PATENT DOCUMENTS

| | | | |
|---|---|---|---|
| 2017/0034303 A1* | 2/2017 | Hinrichs | H04L 67/34 |
| 2017/0039242 A1* | 2/2017 | Milton | H04W 4/02 |
| 2017/0116136 A1* | 4/2017 | Macnicol | G06F 16/2255 |
| 2017/0250798 A1* | 8/2017 | Enga | H04L 9/0643 |
| 2019/0080063 A1* | 3/2019 | Rice | G06F 21/6245 |
| 2019/0087506 A1* | 3/2019 | Choh | G06F 16/951 |
| 2020/0233919 A1* | 7/2020 | Howe | G06F 16/9014 |

* cited by examiner

CREATING A SECURE SEARCHABLE PATH BY HASHING EACH COMPONENT OF THE PATH

BACKGROUND OF THE INVENTION

Field of the Invention

This invention relates generally to obfuscating components of a path and, more particularly to enabling a directory structure to be traversed while maintaining a security of the components of the path.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of a computing device, such as Dell®, may install software on each computing device that (i) gathers logs (e.g., information about particular events occurring on the computing device) and (ii) sends the logs (e.g., as telemetry data) to a server associated with the manufacturer. The manufacturer may analyze the logs to determine how each computing device is being used, which applications are being used, which computing resources are being used, and the like to enable the manufacturer to improve the computing device. One issue with sending such logs is that the logs may include personal identifiable information (PII). For example, if the operating system creates a user directory with the username of each user, then a log may include a path that includes the username. To illustrate, if a user John Smith creates a username jsmith, then the operating system may create a subfolder C:\users\jsmith. A log may include a path to a file in the jsmith directory, e.g., C:\users\jsmith\example.txt. If a hacker or other malicious actor gains access to the log, then the username is exposed. In addition, in certain jurisdictions, laws may make it illegal to transmit or otherwise expose PII.

Current solutions to protect the components of a path name from exposure to malicious actors is to hash or obfuscate the entire path. However, such an approach prevents the telemetry data from being analyzed. For example, the manufacturer may not be able to determine how many files are stored in a particular path, how often each folder in a path is accessed, and the like when the entire path is hashed or obfuscated.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device creates an event log based on determining that a particular event occurred. If the event log includes a path comprising one or more components, then the computing device may determine a hash, using a hash function and a salt, for a particular component of the one or more components. If the computing device determines that the hash is included in a dictionary, then the computing device may substitute the particular component in the path with an index associated with the hash that was retrieved from the dictionary. If the computing device determines that the hash is not included in a dictionary, then the computing device may create an index, associate the index with the hash, and add the hash-index pair to the dictionary. The computing device may substitute the particular component in the path with the index that was created. The computing device may repeat the process until each component in the path has been replaced with an index to a hash of the component that is stored in the dictionary. The path comprised of components is converted into a modified path comprised of indexes (e.g., an array of indexes).

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
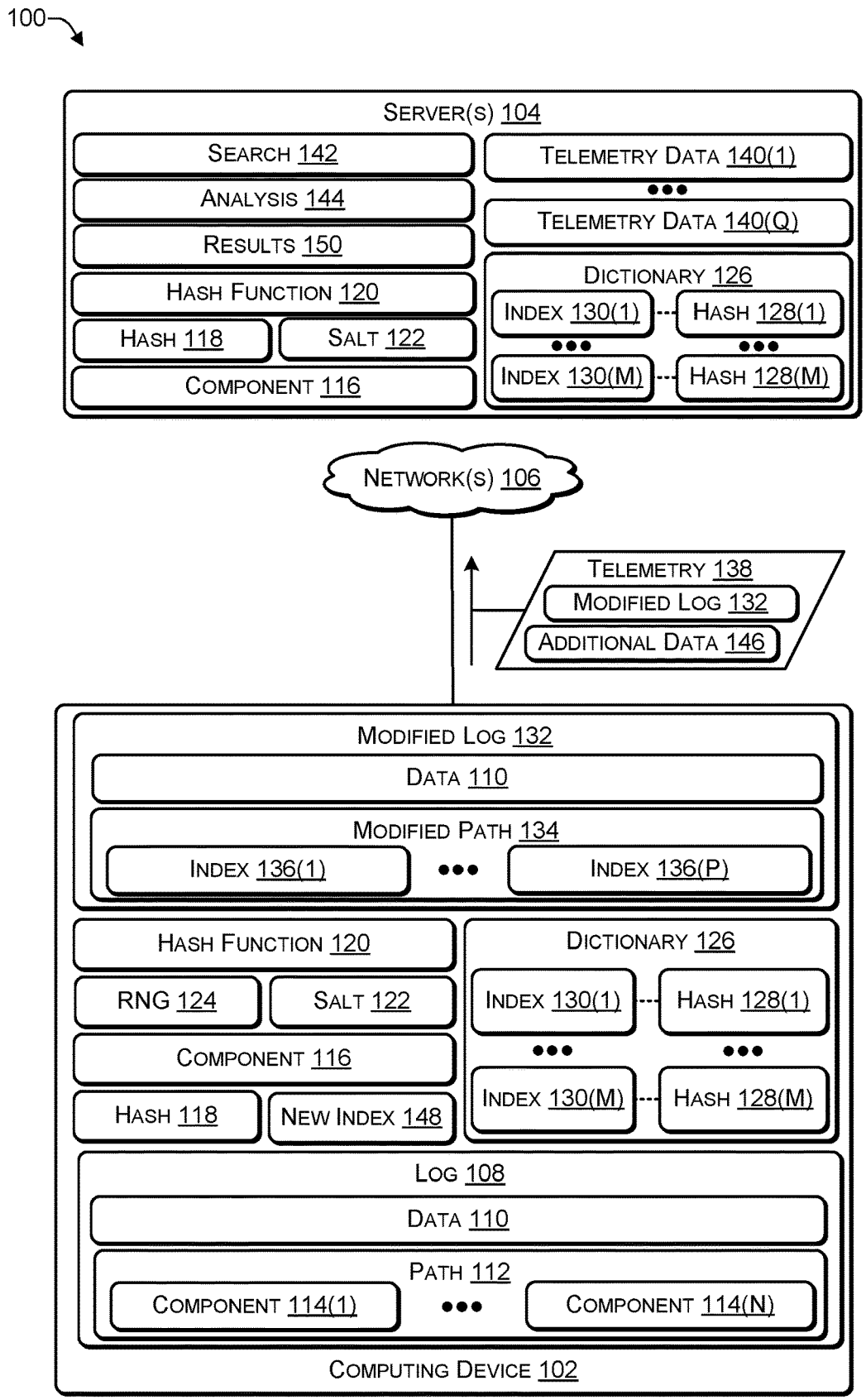
FIG. 1 is a block diagram of a system that includes a computing device connected to a dock, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide the ability to traverse a directory structure while maintaining a security of the components of a path. For example, a path may include a plurality of components, such as, for example, a drive name (or drive letter), a volume name, a device name, a folder name, a file name, another component of a path, or any combination thereof. Each component of the path may be hashed to create a modified path (e.g., a hashed path). The modified path provides security because each of the components of the original path cannot be determined but the directory structure of the modified path can be traversed, paths containing a particular component can be identified, and analytics can be performed on multiple modified paths. In this way, a manufacturer can analyze logs sent from multiple computing devices without exposing personally identifiable information (PII) to malicious agents. For example, forensic and other types of analysis tools may be used to search and analyze log files without exposing PII.

Before a path is stored in a log, a hash value corresponding to each component in the path is created using a hash function and a salt (e.g., cryptographic salt). For example, the hash function may be a message digest (e.g., MD5), a secure hash algorithm (e.g., SHA-1, SHA256, SHA512, SHA-3, or the like), BLAKE (e.g., BLAKE2s, BLAKE2b, or the like), or another type of hash function. The salt is random data used as an input (e.g., in addition to the path component) to the hash function. A new random salt may be generated for each path component, each log, or each computing device. The salt may be created using a random number generator and stored securely on each computing device. The salt may be stored in a dictionary that is provided with the log files that include the modified paths.

After a hash of the path component is created, a search of a dictionary of hash values and indexes is performed to determine if the dictionary includes the hash. If the hash is included in the dictionary, then an index corresponding to the hash is selected to replace the component in the path. If the hash is not in the dictionary, a new index is created and the pair (e.g., the new index and the hash) is added to the dictionary. In the log, the path component is replaced with the index of the hash entry in the dictionary. This process is repeated for each component of the path until each component is replaced with an index to a hash in the dictionary, thereby creating the modified path. The salt may be saved in the dictionary. The dictionary may be saved and provided with the log files that include the modified paths.

When the logs with the modified paths are viewed, the logs include paths with index values that reference hashed values stored in a dictionary. In this way, the names of the components of the original path are protected (e.g., not viewable) while enabling the directory structure to be traversed and searched. For example, when performing a forensic analysis, if a component name (e.g., directory or file name) is known, then the component name is hashed with the salt and a search performed for the corresponding dictionary entry. If the dictionary does not include a corresponding dictionary entry, then the log does not include any information associated with the component name. If the dictionary includes a corresponding dictionary entry, then the index value for the component is retrieved. In addition, each of the other components of the modified path may be selected, the corresponding hash value retrieved from the dictionary, and the path with the hashed components determined (e.g., reconstructed).

Unlike a conventional scheme in which the entire path is obfuscated (e.g., hashed), hashing each component to create a modified path enables data that includes the modified path to be searched enables reconstruction of the directory structures. For example, each occurrence of the path "C:\Users\JSmith" stored in a log file (or other data) is hashed to the same modified path, e.g., "Index1:\Index2\Index3", where Index1, Index2, and Index3 reference entries in a dictionary to the hashes corresponding to "C", "Users", and "JSmith".

In some cases, telemetry data sent by a computing device may include a producer data section to provide information about the source (e.g., computing device) of the telemetry data. The producer data section may include identifying information, such as, for example, a system name, a system identifier (e.g., a unique identifier such as a serial number or service tag), internet protocol (IP) addresses, a geographic location, and the like. The producer data section may include information to help decode the telemetry data, such as, for example, the salt used by the hashing function to create the hashes, a map of file system mount points to volume names, and the like.

The dictionary may include multiple hashes (e.g., of path components, with each hash mapped to a corresponding index (e.g., index value). The dictionary may be viewed as an array of entries, with each index used to select a location in the array. Each entry in the dictionary may include links to create an Adelson-Velsky and Landis (AVL) tree to rapidly search the dictionary using a hash. An AVL tree is a self-balancing binary search tree. In an AVL tree, the heights of two child subtrees of any node differ by at most one. If at any time they differ by more than one, then the AVL tree is rebalanced to restore this property. Lookup, insertion, and deletion may each take a function of log n time in both the average and worst cases, where n is the number of nodes in the tree prior to the operation. Insertions and deletions may cause the tree to be rebalanced by one or more tree rotations.

Each entry in the dictionary includes a hash of a component in a path. The telemetry data is a type of log that includes data associated with a particular event. If the data includes a path, the path is converted to an array of index values into the dictionary. When a log entry that includes one or more paths is created, each path is converted to an array of indexes (e.g., 32 bit indexes) that reference the dictionary. A hashing function, using a salt, creates a hash corresponding to each component of the path. A search is performed to determine if the dictionary includes the resulting hash. If the hash is not found in the dictionary, then a new entry is added to the dictionary that includes the hash and an index to access the hash. If the hash is found in the dictionary, then the index associated with the hash is retrieved. The index of the dictionary entry associated with the hash is placed in the path (e.g., the index replaces the component in the path). In this way, a path comprised of components is converted into a modified path comprised of indexes to hashes of the components stored in a dictionary, thereby preventing PII and other sensitive information from being exposed.

The resulting modified path can be traversed and searched. For example, to determine if a component (e.g., a directory or a filename) is included in a data file, the hash function and salt are used to create a hash of the component. The dictionary is searched to determine in the hash is included in the dictionary. If the hash is not found in the dictionary, then the component is not included in the data file. If the hash is found in the dictionary, then the component is included in the data file. The index corresponding to the hash may be retrieved from the dictionary and a search may be performed, using the index, of other paths (e.g., other path arrays). If the index is found in a second path, then the component is included in the second path. In this way, a manufacturer of the computing device can perform an analysis of telemetry data gathered from multiple computing devices to identify usage patterns and the like.

As an example, a computing device may include one or more processors and one or more non-transitory computer readable media storing instructions executable by the one or more processors to perform various operations. The operations may include determining that a file includes a path. For example, the file may include an event log that was generated based on determining that a particular event occurred on the computing device. The operations may include selecting a component of the path and generating a hash corresponding to the component. For example, the component may include a drive name, a drive letter, a volume name, a device name, a folder name, a file name, or any combination thereof. A hash function and a salt (e.g., a randomly generated number) may be used to generate the hash corresponding to the component. The operations may include determining that the hash is included in a dictionary, determining an index in the dictionary associated with the hash, and adding the index to the path to a modified path. Thus, a particular component of the path has a corresponding index (to a dictionary entry of the hash of the particular component) in the modified path. The corresponding index accesses a particular hash stored in the dictionary. The operations may include sending, to a server, a modified file comprising the modified path. The modified path may include an array of indexes into the dictionary. The modified file may include the dictionary, the salt, the hash function, information to identify the computing device, or any combination thereof. The information to identify the computing device may include at least one of a system name, a system identifier, a serial number, a service tag, or an internet protocol (IP) address. The operations may include selecting a second component of the path and generating a second hash corresponding to the second component. The operations may include determining that the second hash is excluded from the dictionary, creating a second index, associating the second index with the second hash, and adding the second index and the second hash to the dictionary. The operations may include adding the second index to the modified path. The server may perform a search of the modified file to determine if the modified file includes a particular component (e.g., a file name, a folder name, or the like). For example, the server may determine a particular hash based at least in part on the particular component. If the server determines that the particular hash is included in the dictionary associated with the modified file then the particular component is included in the modified file. If the server determines that the particular hash is not included in (e.g., excluded from) the dictionary associated with the modified file, then the particular component is not in the modified file.

FIG. 1 is a block diagram of a system 100 that includes a computing device connected to a dock, according to some embodiments. The system 100 includes a representative computing device 102 coupled to a server 104 via a network 106 (the network 106 may include one or more networks). Of course, with a manufacturer such as, for example, Dell®, hundreds of thousands (or millions) of computing devices, similar to the computing device 102, may send telemetry data to the servers 104.

When a particular event occurs, the computing device 102 may gather information associated with the event to create a log 108. For example, the particular event may include when a user first powers on a computing device, when another type of user-initiated event occurs, when an involuntary restart of the operating system occurs, when another type of operating system-initiated event occurs, when an application crashes, when another type of application-related event occurs, and the like. The log 108 may include data 110 and at least one representative path 112. While the log 108 is shown as having the representative path 112 for illustration purposes, it should be understood that the log 108 may include more than one path. The path 112 may include one or more components 114(1) to 114(N) (where N>0). The components 114 of the path 112 may include, for example, a drive name (or a drive letter), a volume name, a device name, a folder name, a file name, another component of a path, or any combination thereof.

When the computing device 102 determines that the log 108 includes a path, such as the representative path 112, the computing device 102 may create a modified log 132 (e.g., corresponding to the log 108) that includes a modified path 134 (e.g., corresponding to the path 112). The modified path 134 may also be referred to as a hashed path. The modified log 132 may be sent to the server 104 instead of the log 108 to prevent personally identifiable information (PII) from being sent to the server 104.

A component 116, e.g., one of the components 114(1) to 114(N), may be selected and a corresponding hash 118 created using a hash function 120 and a salt 122. The hash function 120 may use a message digest (e.g., MD5) algorithm, a secure hash algorithm (e.g., SHA-1, SHA256, SHA512, SHA-3, or the like), BLAKE (e.g., BLAKE2s, BLAKE2b, or the like), or another type of hashing algorithm. The salt 122 may be random data used as an input (e.g., in addition to the component 116) to the hash function 120. The salt 122 may be created using a random number generator (RNG) 124 and stored securely on the computing device 102. For example, the salt 122 may be stored in (or associated with) a dictionary 126.

After the computing device 102 creates the hash 118 corresponding to the component 116, the computing device 102 may perform a search of the dictionary 126 to determine if the hash 118 is included in the dictionary 126. The dictionary 126 may include hash values 128(1) to 128(M) and corresponding indexes 130(1) to 130(M) (where M>0). If the hash 118 is included in the dictionary 126, then one of the indexes 130 corresponding to the hash 118 is selected to replace the component 116 in the path 112 to create the modified path 134. For example, if the hash 118 matches the hash 128(M), then the index 130(M) corresponding to the hash 128(M) may be selected and used to replace the component 116 in the modified path 134. If the hash 118 is not in the dictionary 126, a new index 148 is created and the pair (e.g., the new index 148 and the hash 118) is added to the dictionary 126. In the modified log 132, each of the path components 114 are replaced with one of the indexes 136(1) to 136(P) (P>0) corresponding to one of the hashes 128(1) to 128(M) in the dictionary 126. This process of creating the hash 118 for the component 116, determining a corresponding index 130 in the dictionary 126, and replacing the component 114 in the path 112 with the index 136 in the modified path 134 is repeated for each component 114 of the path 112 until each component 114 is replaced with a corresponding index 136. Each of the indexes 136 refer to one of the hashes 128 stored in the dictionary 126. The salt 122 may be saved in (or with) the dictionary 126. The dictionary 126 may be saved and provided with log files, such as the modified log 132, that include a modified path, such as the modified path 134.

Thus, the modified log 132 may include the data 110 and the modified path 134. The modified path 134 may include the indexes 136. Each of the indexes 136 may reference one of the hashes 128 in the dictionary 126. The modified path 134 provides a secure way of transmitting the information in the modified log 132 to the server 104 because the modified log 132 does not include PII.

The computing device 102 may send telemetry data 138 to the server 104. The telemetry data 138 may include the modified log 132 and additional data 146 (e.g., producer data). For example, the additional data 146 may include the dictionary 126, the salt 122, the hash function 120, information about the computing device 102 (e.g., a system name, a system identifier, and a unique identifier such as a serial number or service tag), an IP address of the computing device 102, a geographic location of the computing device 102, and the like. The additional data 146 (e.g., producer data) may include information to help decode the telemetry data 138, such as, for example, the salt 122 used by the hashing function 120 to create the hashes 128, a map of file system mount points to volume names, and the like.

The server 104 may receive and store the telemetry data 138. For example, telemetry data 140(1) to 140(Q) (Q>0) may include previously received telemetry information from the computing device 102 as well as other computing devices. The server 104 may be capable of (i) performing a search 142 and (ii) performing an analysis 144 of the telemetry data 140 (including the telemetry data 138) to create results 150.

To perform the search 142 of the telemetry data 140 to identify a particular file name (or folder name), a hash of the particular file name (or folder name) may be created using the hash function 120 and the salt 122. A determination may be made whether the hash is included in the dictionary 126. If the hash is not included in the dictionary 126, then the file name (or folder name) is not in the telemetry data 140. If the hash is included in the dictionary 126, then the entry (e.g., hash-index pair) is identified and the index associated with the hash retrieved from the dictionary 126. The telemetry data 140 may be searched to identify entries that include path information (e.g., delimiting characters, such as ":", "\", and the like). Each modified path may be searched for the index corresponding to the hash of the file. If the index is found in a modified path in the telemetry data 140, then the modified path, in which the index is found, is a match, indicating that the particular file name (or folder name) is present in the modified path.

To perform the search 142 of the telemetry data 140 to identify particular files in a folder, a path array of the modified path 134 may be created. The path array may be an array that includes an array of 32-bit indexes into the dictionary 126. For example, Path:\Device\Disk\Volume\Folder1\Folder2\Folder3\ File.ext may be converted into a path array

P=(1, 2, 5, 3, 6, 7, 4)

where "1" is an index to a hash of "Device" (e.g., in the dictionary 126), "2" is an index to a hash of "Disk", "5" is an index to a hash of "Volume", "3" is an index to a hash of "Folder1", "6" is an index to a hash of "Folder2", "7" is an index to a hash of "Folder3", and "4" is an index to a hash of "File.ext". A search of the telemetry data 140 may be performed for entries with path information. If any one of the indexes are not found in the modified paths identified in the telemetry data 140, then the particular files are not included in the telemetry data 140. If the beginning of the path array in an entry in the telemetry data 140 matches the path array that was created, then the telemetry data 140 includes information about contents of the folder.

Thus, a computing device may generate a log when a particular event occurs. Prior to sending telemetry data that includes data collected in the log to a server, the computing device may create a modified log for security purposes. The computing device may identify each path in the log, select a component in the path, and create a hash of the component using a hashing function and a salt. If the hash is not included in a dictionary, then a new index may be created, associated with the hash, and the new index and associated hash may be stored in the dictionary. If the hash is included in the dictionary, then an index associated with the hash may be retrieved from the dictionary. By replacing the selected component with an index (e.g., to a hash in the dictionary), a modified path corresponding to the path may be created. This process may be repeated until all the components in the path have been replaced with index values to hashes stored in the dictionary. The resulting modified path may be an array of index values. In this way, PII and other sensitive information included in a file name, a folder name, a volume, or the like is secured because viewing the modified path that includes index values does not provide any information about file names, directory names, and the like. The resulting modified path can be used when analyzing telemetry data because the directory structure can be navigated. For example, using telemetry data in which paths have been replaced by path arrays of index values, searching for a particular file name and searching for particular files in a particular folder is possible, thereby enabling analysis of the telemetry data.

Figure 2:
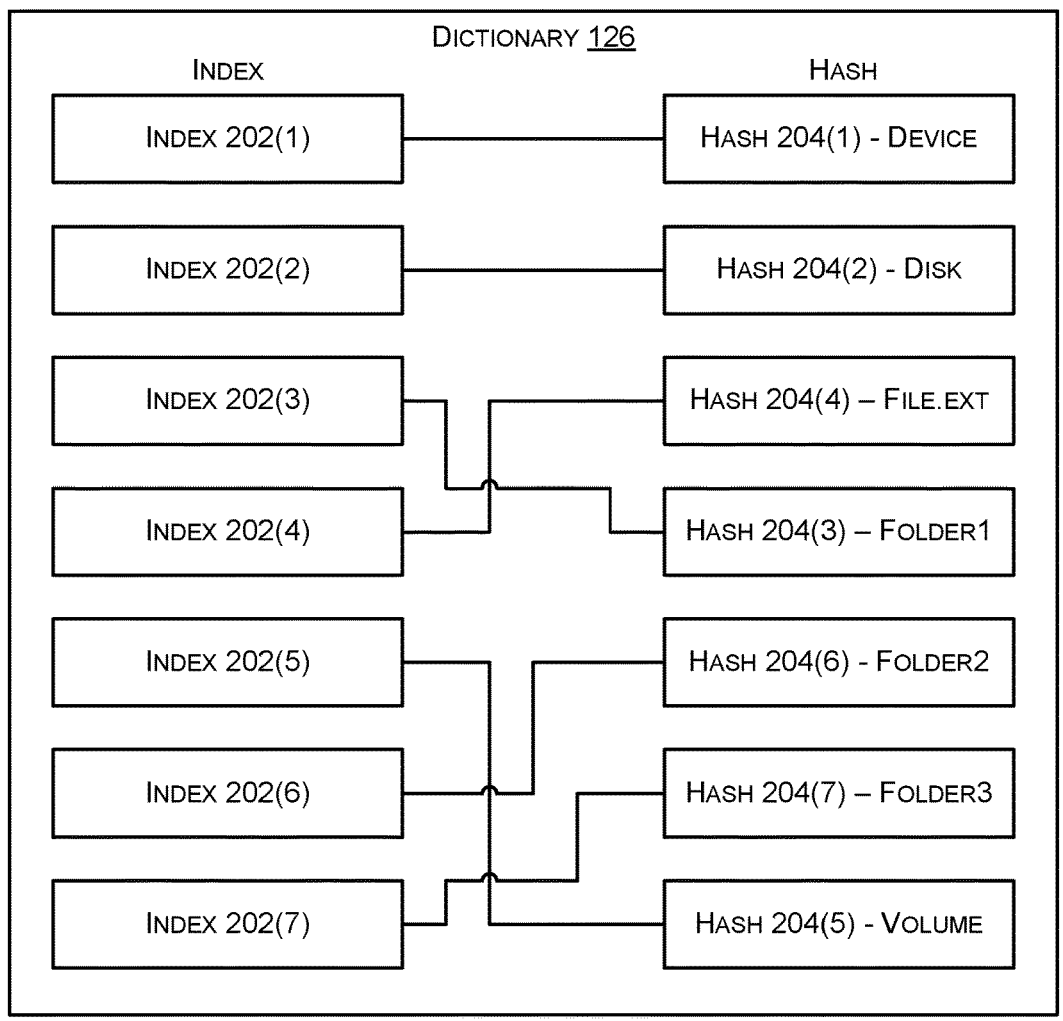
FIG. 2 is a block diagram illustrating creating a modified path, according to some embodiments.
Figure 2:
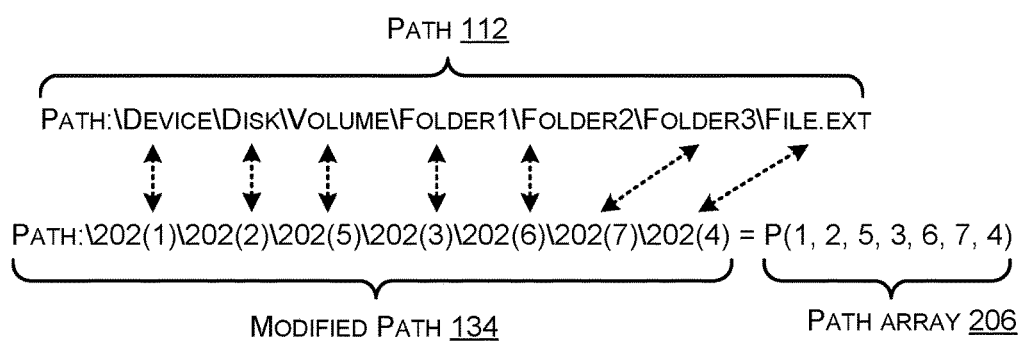

FIG. 2 is a block diagram 200 illustrating creating a modified path, according to some embodiments. For example, assume the path 112 comprises:

Path: \Device\Disk\Volume\Folder1\Folder2\Folder3\File.ext

The dictionary 126 includes an index value associated with a hash of a component of the path 112. For example, index value 202(1) is associated with a hash 204(1) of the path component "Device", index value 202(2) is associated with a hash 204(2) of the path component "Disk", index value 202(3) is associated with a hash 204(3) of the path component "Folder1", index value 202(4) is associated with a hash 204(4) of the path component "File.ext", index value 202(5) is associated with a hash 204(5) of the path component "Volume", index value 202(6) is associated with a hash 204(6) of the path component "Folder2", and index value 202(7) is associated with a hash 204(7) of the path component "Folder3". In this example, the modified path 134 comprises:

Path:\202(1)\202(2)\202(5)\202(3)\202(6)\202(7)\202(4)

The path 134 can be expressed as a path array 206:

Path Array=(1, 2, 5, 3, 6, 7, 4)

Thus, each component of the path 112 is replaced with an index 202 (e.g., to a hash 204 in the dictionary 126) to create the modified path 134. The modified path 134 may be expressed as the path array 206. In this way, PII and other sensitive information included in a file name, a folder name, a volume, or the like is secured because viewing the modified path 134 that includes index values 202 does not provide any information about file names, directory names, and the like.

Figure 3:
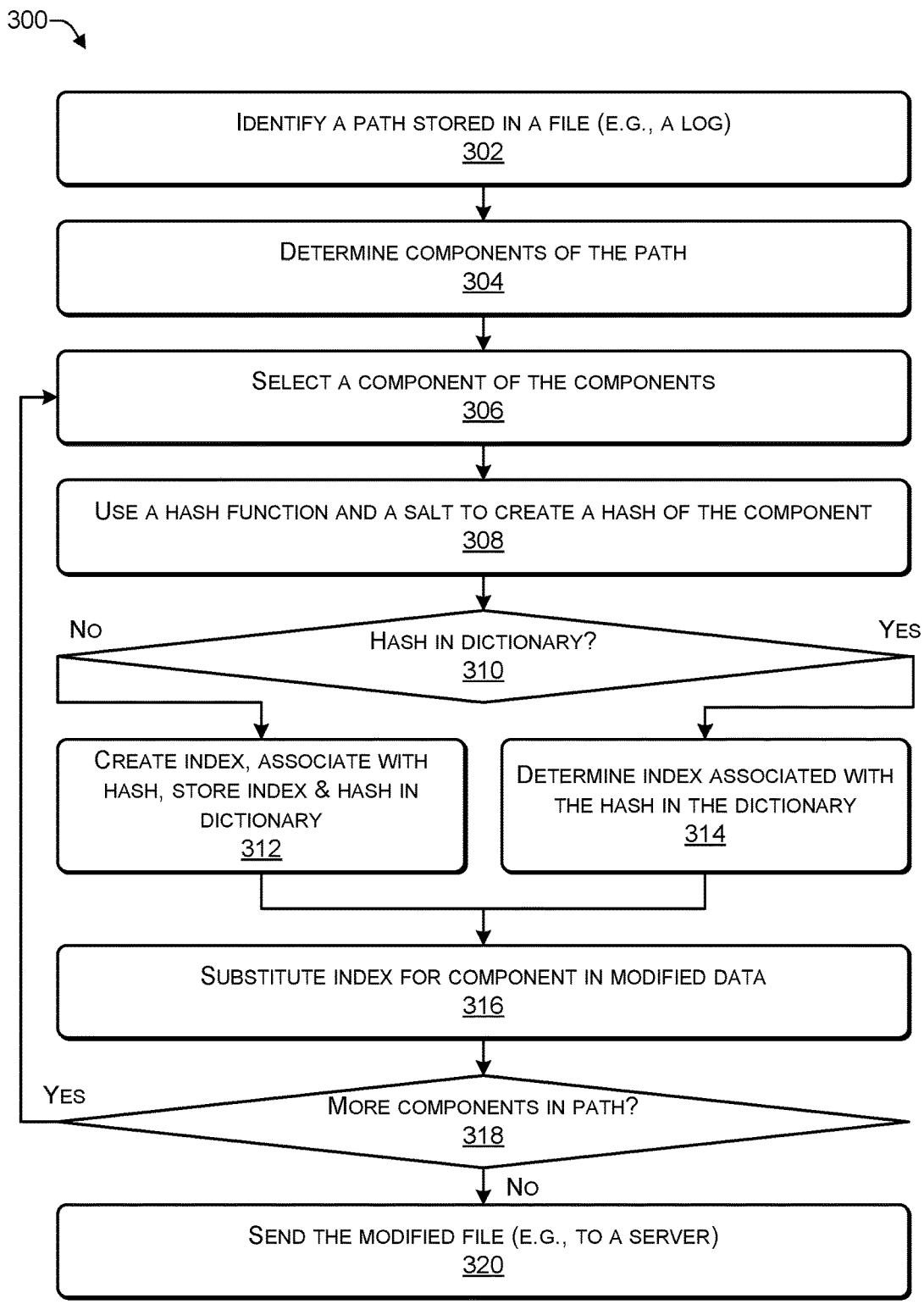
FIG. 3 is a flowchart of a process to hash each component of a path, according to some embodiments.
Figure 4:
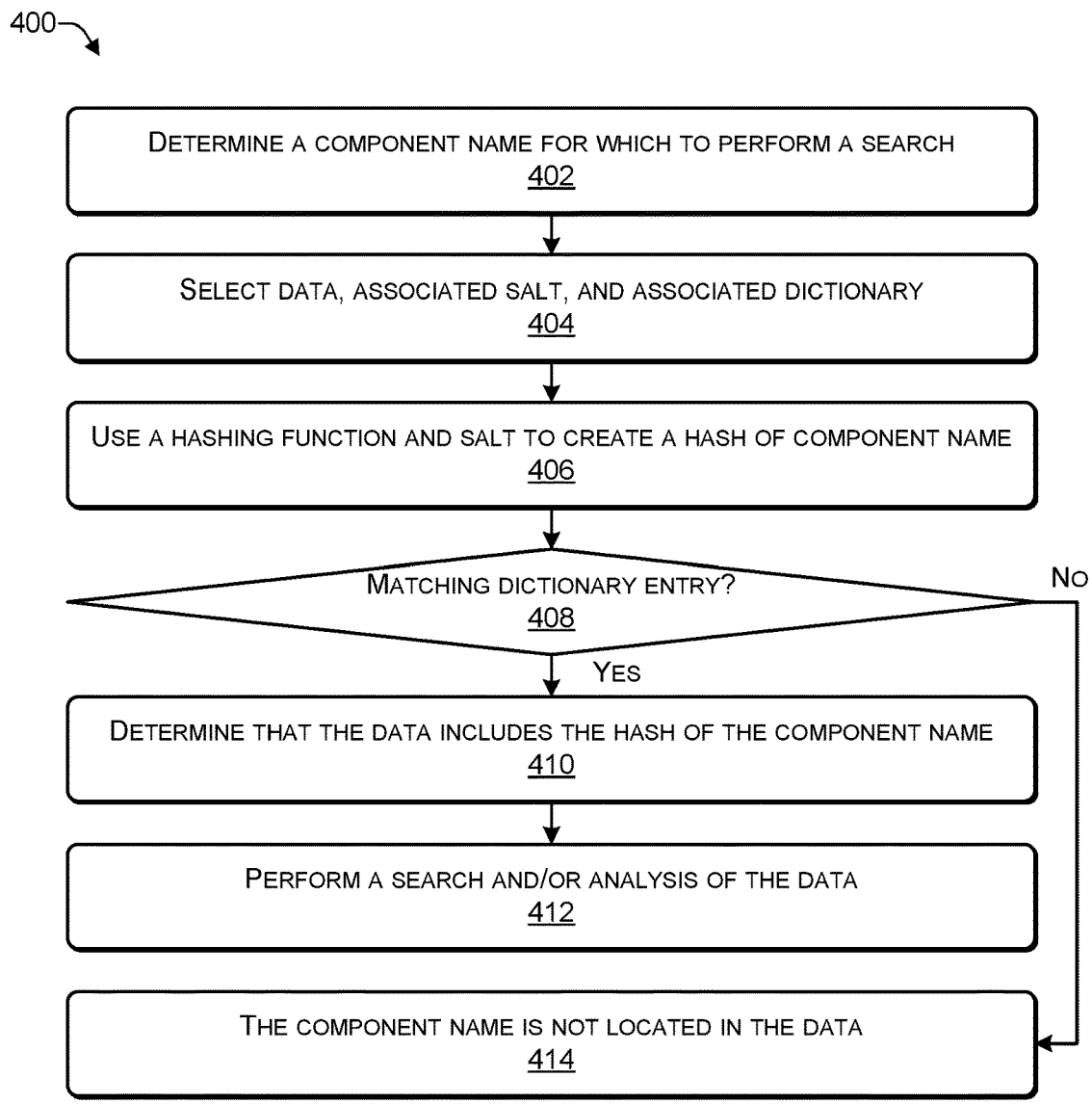
FIG. 4 is a flowchart of a process that includes identifying a path that includes a particular component, according to some embodiments.

In the flow diagram of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400, are described with reference to FIGS. 1 and 2 as described above, although other models, frameworks, systems and environments may be used to implement these processes.

FIG. 3 is a flowchart of a process 300 to hash each component of a path, according to some embodiments. For example, the process 300 may be performed by the computing device 102 of FIG. 1.

At 302, the process may identify a path stored in a file (e.g., an event log). At 304, the process may identify one or more components of the path. For example, in FIG. 1, when a particular event occurs, the computing device 102 may gather information associated with the event to create the log 108. The log 108 may include the data 110 and the representative path 112. The path 112 may include one or more components 114(1) to 114(N). The components 114 of the path 112 may include, for example, a drive name (or a drive letter), a volume name, a device name, a folder name, a file name, another component of a path, or any combination thereof.

At 306, the process may select a component of the one or more components. At 308, the process may use a hash function and a salt to create a hash of the component. At 310, the process may determine if the hash is included (e.g., found) in a dictionary. For example, in FIG. 1, a component 116, e.g., one of the components 114(1) to 114(N), may be selected and a corresponding hash 118 created using the hash function 120 and the salt 122. The computing device 102 may perform a search of the dictionary 126 to determine if the hash 118 is included in the dictionary 126.

If the process determines, at 310, that "no" the hash is not in the dictionary, then the process, at 312, creates an index, associates the index with the hash, and stores the index and hash in the dictionary. If the process determines, at 310, that "yes" the hash is in the dictionary, then the process, at 314, determines (e.g., retrieves) an index associated with the hash from the dictionary. For example, in FIG. 1, if the hash 118 is included in the dictionary 126, then one of the indexes 130 corresponding to the hash 118 is selected to replace the component 116. If the hash 118 is not in the dictionary 126, a new index 148 is created and the pair (e.g., the new index 148 and the hash 118) is added to the dictionary 126.

At 316, the process substitutes the index for the component in modified data. At 318, the process determines if there are more components in the path. If the process determines, at 318, that "yes" there are more components in the path, then the process proceeds to 306, where a next component of the components in the path is selected. The process repeats 306, 308, 310, 312/314, and 316 until all the components in the path have been selected. For example, in FIG. 1, in the modified log 132, each of the path components 114 may be replaced in turn with one of the indexes 136(1) to 136(P) (P>0) corresponding to one of the hashes 128(1) to 128(M) in the dictionary 126. The process of creating the hash 118 for the component 116 (e.g., one of the components 114(1) to 114(N), determining a corresponding index 130 in the dictionary 126, and replacing the component 114 in the path 112 with the index 136 in the modified path 134 may be repeated for each component 114 of the path 112, e.g., until each component 114 is replaced with a corresponding index 136.

At 320, the modified file (e.g., modified log) may be sent (e.g., to a server). For example, in FIG. 1, the computing device 102 may send telemetry data 138 to the server 104. The telemetry data 138 may include the modified log 132 and additional data 146 (e.g., producer data), such as one or more of the hash function 120, the salt 122, or the dictionary 126.

Thus, a computing device may collect data and create a log when a particular event occurs. Prior to sending telemetry data that includes the collected data, the computing device may create a modified log to obscure file names and folder names that could be used to determine a username (or other sensitive information). For each particular path in the log, the computing device may select a component in a particular path, and create a hash of the component using a hashing function and a salt. If the hash is not included in a dictionary, then a new index may be created, associated with the hash, and the new index and associated hash may be stored in the dictionary. If the hash is included in the dictionary, then an index associated with the hash may be retrieved from the dictionary. The selected component may be replaced with an index (e.g., to a hash in the dictionary) to create a modified path corresponding to the path. This process may be repeated until all the components in the path have been replaced with index values to hashes stored in the dictionary. The resulting modified path may be an array of index values. In this way, PII and other sensitive information included in a file name, a folder name, a volume, or another path component is secured because viewing the modified path that includes index values does not provide any information about the component names in the path.

FIG. 4 is a flowchart of a process 400 that includes identifying a path that includes a particular component, according to some embodiments. For example, the process 400 may be performed by the server 104 of FIG. 1.

At 402, the process may select a component name (e.g., a file name, a folder name, or the like) for which to perform a search. At 404, the process may select data in which to search for the component name and retrieve a salt and a dictionary associated with the data. For example, in FIG. 1, the server 104 may perform the search 142 and/or the analysis 144 by selecting one or more of the telemetry data 140. Each of the telemetry data 140 may include one or more modified logs (e.g., the modified log 132) and additional data 146, such as, for example, an associated dictionary (e.g., the dictionary 126), an associated salt (e.g., the salt 122), an associated hash function (e.g., the hash function 120), and the like.

At 406, the process may use a hashing function and the salt to create a hash of the component name. At 408, the process may determine if the dictionary associated with the data includes an entry (e.g., index-hash pair) that includes the hash of the component name. For example, in FIG. 1, the server 104 may use the hash function 120 and the salt 122 (e.g., included in the telemetry data 138 as the additional data 146) to create the hash 118 of the component 116. The server 104 may determine if the dictionary 126 associated with the telemetry data 140 includes the hash 118.

If the process determines, at 408, that "yes" the dictionary includes an entry with the hash of the component name, then the process may proceed to 410. At 410, the process may determine that the data includes the hash of the component name. At 412, the process may perform a search and/or analysis of the data. For example, in FIG. 1, if the server 104 determines that the dictionary 126 associated with the telemetry data 140 includes the hash 118, then the telemetry data 140 includes the hash 118 corresponding to the component name (e.g., file name, folder name, or other component name) for which the search is being performed. The server 104 may search the telemetry data 140 to find other occurrences of the hash 118 and perform an analysis based on the search.

If the process determines, at 408, that "no" the dictionary does not include an entry with the hash of the component name, then the process may proceed to 414, where the process may determine that the component name (e.g., file name, folder name, or the like) is not located in the data. For example, in FIG. 1, if the server 104 determines that the dictionary 126 associated with the telemetry data 140 does not include the hash 118, then the telemetry data 140 does not include the hash 118 corresponding to the component name. Thus, a dictionary lookup for a hash of a component name can be performed to determine if the data (associated with the dictionary) includes the hash of the component name. The dictionary lookup is typically much faster than searching the telemetry data 140 because the dictionary 126 is typically much smaller than the telemetry data 140. If a hash of a component name is found in a dictionary, then the hash occurs in the telemetry data 140 at least once and further searching can identify all occurrences of the hash of the component name. In this way, the telemetry data 140 can be analyzed without revealing the names of components in each path in the telemetry data 140.

Figure 5:
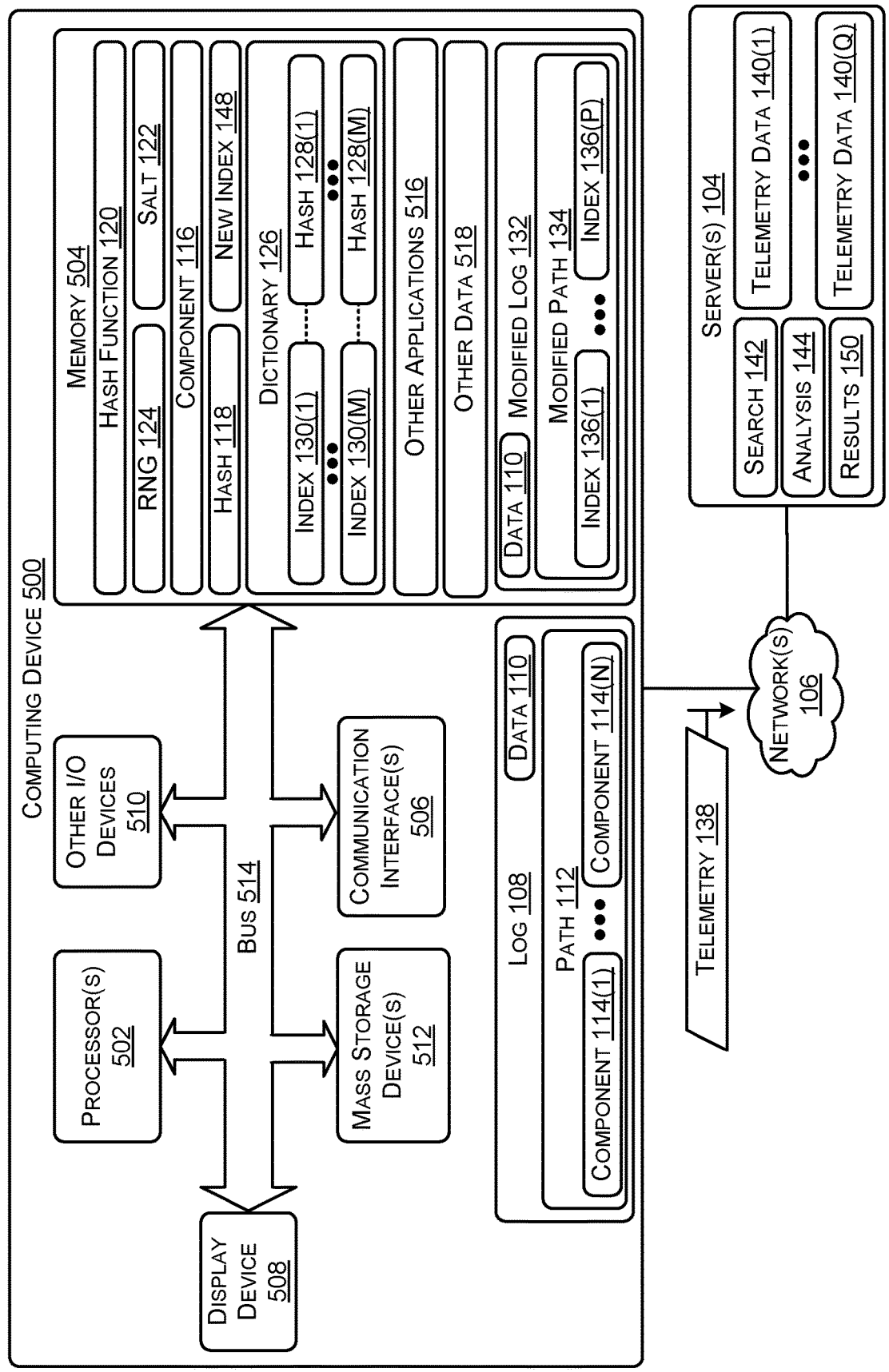
FIG. 5 illustrates an example configuration of a computing device that can be used to implement the systems and techniques described herein.

FIG. 5 illustrates an example configuration of a computing device 500 that can be used to implement the systems and techniques described herein, such as, for example, the server 104, or the computing device 102 of FIG. 1. In FIG. 5, the computing device 500 is shown implementing the computing device 102 of FIG. 1.

The computing device 102 may include one or more processors 502 (e.g., CPU, GPU, or the like), a memory 504, communication interfaces 506, a display device 508, other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via the network 106 (e.g., when the computing device 500 is connected to the dock 104). The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth. The computer storage media, such as memory 116 and mass storage devices 512, may be used to store software and data, such as, for example, the hash function 120, the salt 122, the random number generator (RNG) 124, the dictionary 126, the modified log 132, other applications 516, and other data 518.

The path 112 may include one or more components 114, such as, for example, a drive name (or drive letter), a volume name, a device name, a folder name, a file name, another component of a path, or any combination thereof. Each component 114 of the path 112 may be hashed to create the modified path 132 (e.g., hashed path). The modified path 132 provides security because each of the components 114 of the original path 112 cannot be determined but the directory structure of the modified path 132 can be traversed, paths containing a particular component can be identified, and analytics can be performed on multiple modified paths. In this way, a manufacturer can analyze logs sent from multiple computing devices without exposing filenames, directory names, and the like to malicious agents.

Before the modified log 132 (including the modified path 134) is sent to the server 104, the hashes 128 corresponding to each component 114 in the path 112 is created using the hash function 120 and the cryptographic salt 122. After the hash 118 of the path component 116 is created, a search of the dictionary 126 is performed to determine if the dictionary 126 includes the hash 118. If the hash 118 is included in the dictionary 126, then the index 130 corresponding to the hash 128 stored in the dictionary 126 is selected. If the hash 118 is not in the dictionary 126, a new index 148 is created and the pair (e.g., the new index 148 and the hash 118) is added to the dictionary 126. Each component 114 in the log 108 is replaced with the corresponding index 130 of the hash entry 128 in the dictionary 126. This process is repeated for each component 114 of the path 112 until each component is replaced with one of the indexes 130 associated with one of the hashes 128 in the dictionary 126 to create the modified path 134.

When the modified log 132 with the modified path 134 is viewed, the modified log 132 includes one or more paths with index values that reference hashed values stored in the dictionary 126, e.g., each modified path is an array of index values. In this way, the names of the components 113 of the original path 112 are protected (e.g., not viewable) while enabling the directory structure to be traversed and searched.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by one or more processors, that a file includes an original path including multiple components;
    selecting, by the one or more processors, a first component of the original path;
    generating, by the one or more processors, a first hash value corresponding to the first component;
    determining, by the one or more processors, that the first hash value is included in a dictionary that includes multiple index-hash pairs, each consisting of a hash value of a component in the original path and an index value corresponding to the hash value, wherein each index value in the multiple index-hash pairs is different than its corresponding hash value;
    retrieving, by the one or more processors, a first index corresponding to the first hash value from the dictionary;
    then replacing, by the one or more processors, the first component of the original path with the first index retrieved from the dictionary to create a modified path;
    sending, by the one or more processors, a modified file comprising the modified path, the dictionary, a salt comprising a randomly generated number, and a hash function to generate the first hash value based on the first component and the salt across a network to a server; and
    determining usage patterns in multiple computing devices by searching the first index of other paths.

2. The method of claim 1, further comprising:
    selecting a second component of the original path;
    generating a second hash value corresponding to the second component;
    determining that the second hash value is not included in the dictionary;
    creating a second index that is not included in the dictionary;
    associating the created second index with the second hash value;
    adding an index-hash pair including the created second index and the generated second hash value to the dictionary; and
    replacing the second component of the original path with the created second index to create the modified path.

3. The method of claim 1, wherein generating the first hash value corresponding to the first component comprises:
    generating the first hash value using a hash function and a salt comprising a randomly generated number.

4. The method of claim 3, wherein the modified file further comprises:
    the dictionary;
    the hash function; and
    the salt.

5. The method of claim 1, wherein the first component comprises one of:
a drive name;
a drive letter;
a volume name;
a device name; or
a folder name.

6. The method of claim 1, wherein:
the first component of the original path has the corresponding first index in the modified path; and
the corresponding first index accesses the first hash value stored in the dictionary.

7. The method of claim 1, wherein the modified path comprises an array of indexes.

8. The method of claim 1, wherein the first component comprises a device name.

9. The method of claim 1, where the dictionary is a table that links each index of an index-hash pair to its corresponding hash value, wherein each hash value included within the multiple index-hash pairs corresponds to a different one of the multiple components of the original path.

10. The method of claim 1, further comprising:
selecting, by the one or more processors, each of the multiple components of the original path;
using random data to generate, by the one or more processors, a hash value corresponding to each of the selected components of the original path;
using each generated hash value to select, by the one or more processors, a respective index from the dictionary that corresponds to the generated hash value and its corresponding component of the original path; and
replacing, by the one or more processors, each component of the original path with the selected respective index that corresponds to the generated hash value that corresponds to the component of the original path to create the modified path.

11. The method of claim 10, where each of the selected respective indexes is a different integer number, and where the modified path is an array of the different integer numbers of the selected respective indexes.

12. The method of claim 1, further comprising receiving the modified file in the server, the modified file including the dictionary; and performing, by one or more processors in the server, the following:
selecting a component name for which to perform a search;
then retrieving the dictionary from the modified file received in the server;
then generating, on the server, a hash value of the component name;
then determining if the retrieved dictionary on the server includes an entry that includes the hash value of the component name;
wherein when the retrieved dictionary on the server is determined to include an entry that includes the hash value of the component name, then:
searching other data of the modified file to locate other occurrence/s of the hash value in the other data of the modified file, and
performing an analysis of the other data of the modified file based on the located other occurrence/s of the hash value in the other data of the modified file; and
wherein when the retrieved dictionary on the server is determined not to include an entry that includes the hash value of the component name, then not searching other data of the modified file to locate other occurrence/s of the hash value in the other data of the modified file.

13. The method of claim 12, where the received modified file comprises received first telemetry data sent by a first computing device to the server, the first computing device being one of the multiple computing devices; and where the method further comprises performing, by the one or more processors in the server, an analysis of the received first telemetry data sent by the first computing device together with an analysis of the additional telemetry data received by the server from other of the multiple computing devices to determine the usage patterns of the multiple computing devices.

14. The method of claim 13, further comprising performing, by the one or more processors in the server, the following:
storing the received first telemetry data and the received additional telemetry data; and
then performing the search and the analysis of each of the previously-stored first telemetry data and the previously-stored additional telemetry data to determine the usage patterns of the multiple computing devices.

15. A computing device comprising:
one or more processors; and
one or more non-transitory computer readable media storing instructions executable by the one or more processors to perform operations comprising:
determining that a file includes an original path including multiple components;
selecting a first component of the original path;
generating a first hash value corresponding to the first component;
determining that the first hash value is included in a dictionary that includes multiple index-hash pairs, each consisting of a hash value of a component in the original path and an index value corresponding to the hash value, wherein each index value in the multiple index-hash pairs is different than its corresponding hash value;
retrieving a first index corresponding to the first hash value from the dictionary;
then replacing the first component of the original path with the first index retrieved from the dictionary to create a modified path;
sending, across a network to a server, a modified file comprising the modified path, the dictionary, a salt comprising a randomly generated number, and a hash function to generate the first hash value based on the first component and the salt; and
determining usage patterns in multiple computing devices by searching the first index of other paths.

16. The computing device of claim 15, further comprising:
selecting a second component of the original path;
generating a second hash value corresponding to the second component;
determining that the second hash value is not included in the dictionary;
creating a second index that is not included in the dictionary;
associating the created second index with the second hash value;
adding an index-hash pair including the created second index and the generated second hash value to the dictionary; and replacing the second component of the original path with the created second index to create the modified path.

17. The computing device of claim 15, wherein:
the file comprises an event log generated based on determining that a particular event occurred on the computing device.

18. The computing device of claim 15, wherein the modified file further comprises:
unmodified information outside the modified path to identify the computing device, the unmodified information comprising at least one of a system name, a system identifier, a serial number, a service tag, or an internet protocol (IP) address.

19. The computing device of claim 15, wherein the first component comprises one of:
a drive name;
a drive letter;
a volume name;
a device name; or
a folder name.

20. The computing device of claim 15, wherein:
the first component of the original path has the corresponding first index in the modified path; and
the corresponding first index accesses the first hash value stored in the dictionary.

21. One or more non-transitory computer readable media storing instructions executable by one or more processors to perform operations comprising:
determining that a file includes an original path including multiple components;
selecting a first component of the original path;
generating a first hash value corresponding to the first component;
determining that the first hash value is included in a dictionary that includes multiple index-hash pairs, each consisting of a hash value of a component in the original path and an index value corresponding to the hash value, wherein each index value in the multiple index-hash pairs is different than its corresponding hash value;
retrieving a first index corresponding to the first hash value from the dictionary;
then replacing the first component of the original path with the first index retrieved from the dictionary to create a modified path;
sending, across a network to a server, a modified file comprising the modified path, the dictionary, a salt comprising a randomly generated number, and a hash function to generate the hash based on the component and the salt; and
determining usage patterns in multiple computing devices by searching the first index of other paths.

22. The one or more non-transitory computer readable media of claim 21, wherein:
the file comprises an event log generated based on determining that a particular event occurred on the computing device.

23. The one or more non-transitory computer readable media of claim 21, wherein the operations further comprise:
determining the first hash value based at least in part on the first component;
determining that the first hash value is included in the dictionary associated with the modified file; and
determining that the first component is included in the modified file.

24. The one or more non-transitory computer readable media of claim 21, wherein the first component comprises one of:
a drive name;
a drive letter;
a volume name;
a device name; or
a folder name.

25. The one or more non-transitory computer readable media of claim 21, wherein:
the first component of the original path has the corresponding first index in the modified path; and
the corresponding first index accesses the first hash value stored in the dictionary.

* * * * *